United States Patent [19]
Arpe et al.

[11] 3,865,877
[45] Feb. 11, 1975

[54] PROCESS FOR THE DISPROPORTIONATION OF DIALLYLAMINES

[75] Inventors: Hans-Jurgen Arpe, Fischbach, Taunus; Hansjorg Hey, Langenhain, Taunus, both of Germany

[73] Assignee: Hoechst Aktiengesellschaft, Frankfurt Main, Germany

[22] Filed: Apr. 26, 1973

[21] Appl. No.: 354,850

[30] Foreign Application Priority Data
Apr. 29, 1972 Germany............................ 2221253

[52] U.S. Cl....... 260/583 H, 260/583 R, 260/585 A
[51] Int. Cl............................................. C07c 85/00
[58] Field of Search................................ 260/583 H

[56] References Cited
UNITED STATES PATENTS

| | | | |
|---|---|---|---|
| 3,493,617 | 2/1970 | Shryne et al.................... | 260/583 H |
| 3,530,187 | 9/1970 | Shryne............................ | 260/583 H |
| 3,755,451 | 8/1973 | Kurtz et al..................... | 260/583 H |

FOREIGN PATENTS OR APPLICATIONS

| 489,731 | 8/1938 | Great Britain................. | 260/583 H |
|---|---|---|---|

Primary Examiner—Lewis Gotts
Assistant Examiner—D. R. Phillips
Attorney, Agent, or Firm—Curtis, Morris & Safford

[57] ABSTRACT

A process for the conversion of diallylamines substituted or unsubstituted in the allyl group to the corresponding mono- or triallylamines.

4 Claims, No Drawings

PROCESS FOR THE DISPROPORTIONATION OF DIALLYLAMINES

The present invention relates to a process for the conversion of diallylamines substituted or unsubstituted in the allyl group to the corresponding mono- or triallylamines.

Allylamine per se and allylamines substituted in the allyl group are important for further conversion, for example to allylamides, allylimides or allylurethanes which are used in the fields of plant protection agents, pharmaceuticals and intermediate products.

The process for the manufacture of allylamines and substituted allylamines preferred in industrial practice is the reaction of the corresponding allyl halides with ammonia, in which reaction diallylamines are always formed as main by-products.

The amount of secondary amines is especially large in the case where allyl halides substituted by alkyl in 2-position are reacted with ammonia. Thus, for example, when 2-methylallyl chloride is reacted with a 10 fold excess of ammonia, the amount of secondary amine obtained in nearly 50 percent, relative to the quantity of 2-methylallylamine.

It is therefore of interest to be able to prepare further monoallylamine from the diallylamines obtained as by-products, for example by disproportionation, by which a theoretical amount of 50 mol percent, relative to the secondary amine, of additional primary amine can be obtained.

Furthermore, a disproportionation of diallylamines is advantageous in the case where mixtures of mono-, di- or triallylamines obtained in industrial processes may be converted to mixtures containing only two components, such as mono- and triallylamine, the difference between the boiling points of which is more pronounced, so that the components may be separated by more simple methods.

The present invention relates to a process for the disproportionation of diallylamines of the formula I

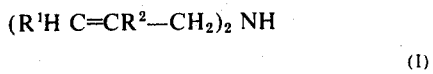

(I)

where $R^1$ and $R^2$ each are hydrogen, lower alkyl or alkenyl having up to 5 carbon atoms, in order to obtain the corresponding mono- and triallylamines of the formulae II and III

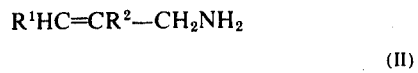

(II)

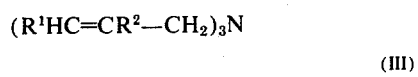

(III)

where $R^1$ and $R^2$ are as defined above, which comprises reacting the diallylamines in the presence of a catalyst system containing a compound or a complex of palladium and a tertiary phosphine.

Suitable starting compounds for the process of the invention are for example: diallylamine, di-(2-methylallyl)-amine, di-(2-ethylallyl)-amine, di-(3-methylallyl)-amine, di-(2,3-dimethylallyl)-amine, di-(2-ethyl-3-propylallyl)-amine, di-(3-butylallyl)-amine, di-(2,7-octadienyl)-amine, or compounds of similar composition being differently substituted by alkyl groups. However, also diallylamines being substituted by long chain alkyl or alkenyl, or hetero-atoms containing alkyl may be successfully subjected to the disproportionation process of the invention.

The following compounds are especially interesting for the industrial practice since they can be easily prepared and applied: diallylamine, di-(2-methylallyl)-amine, (or dimethallylamine), di-(3-methylallyl)-amine (or dicrotylamine) or di-(2,7-octadienyl)-amine which can be easily prepared from butadiene.

Also alkylallylamines may be disproportionated to form alkylamines and diallyl-alkylamines in the presence of palladium compounds or palladium complexes with triphenylphosphine. For example, butylallylamine may be converted to butylamine and diallyl-butylamine in a practically quantitative yield.

The catalyst used for the process of the invention is a combination of a palladium compound or a palladium complex and a tertiary phosphine. Both catalyst components individually, that is, a phosphorous-free palladium compound or a tertiary phosphine alone, practically do not catalyze the disproportionation.

The catalyst used in the process of the invention is formed when a palladium compound and a tertiary phosphine are joined. It is not important for the formation of the active catalyst whether the palladium compound and the tertiary phosphine are added separately to the reaction mixture, or whether the phosphine is completely or partially contained in the palladium compound before its addition to the reaction mixture. In both cases, a reactive catalyst system can be formed directly under the reaction conditions.

For the formation of the catalyst system, palladium compounds of different chemical structure may be used, for example salts of inorganic and/or organic acids, such as palladium chloride or palladium acetate, or double salts of palladium chloride and alkali halides, or for example complex palladium compounds, such as benzonitrile-palladium chloride, palladiumacetylacetonate, bis(pyridine)-palladium chloride, or palladium compounds having polymer organic or inorganic counter-ions, for example ion exchangers or zeolites. A suitable phosphine containing palladium compound is for example bis-(triphenylphosphine)-palladium chloride.

As second component of the catalyst system, tertiary phosphines of the formula $PR_3$ are used. In this formula, R may be an aromatic and/or aliphatic radical, for example in the case of tributylphosphine or triphenylphosphine. Preferably triphenylphosphine is used as second catalyst component.

The tertiary phosphines have an additional stabilizing effect on such palladium compounds which, especially at elevated temperatures and in the presence of certain organic compounds, may be easily reduced to metallic palladium.

It is characteristic for the process of the invention that already very small amounts of the active catalyst system cause the disproportionation of the diallylamines. The palladium concentration may vary within wide limits, for example within a range of from 0.1 and 5 mole percent, but also amounts exceeding these limits are suitable.

The molar ratio of palladium compound to tertiary phosphine may vary within the wide limits too. The minimum atomic ratio of phosphorus to palladium should be from 2 to 3:1; but this ratio may be increased for example up to from 100 to 1000:1.

In the process of the invention, the diallylamines may be reacted with the catalyst in the presence or in the absence of solvents. Very often, an addition of an alkaline phenolate brings about a catalytic effect, that is, an increase of the reaction speed, which is an advantage.

An advantageous operation mode of the disproportionation process is the following: the diallylamines, together with the components of the catalyst, optionally with addition of solvents, are refluxed in a reaction vessel with a column connected to it. The boiling temperature of the solvent should be above the boiling temperature of the monoamines, so that the monoamines formed in the reaction may be taken off at the top of the column as the most volatile component. In this case, after complete disproportionation, besides non-converted diamine, only triamine and solvent remain in the reaction vessel. The distillation work-up of this residue is carried out according to known methods.

In principle, the disproportionation may also be carried out in the gaseous phase. In this case, the catalyst components are advantageously applied to a carrier.

The reaction proceeds advantageously under normal pressure, optionally also under reduced pressure, depending on the thermostability of the monoallylamines containing more substituents.

A temperature of from about 110° to 115°C of the refluxing unsubstituted diallylamine as the lowest-boiling diamine, as compared to the substituted diallylamines, is sufficient for the proceeding of the disproportionation, which reaction, however, is also possible at lower temperatures, though at reduced speed. The advantageous use of an elevated temperature in view to an increased space-time-yield is limited only by the thermostability of the allylamines.

Furthermore, it is has been observed that the catalyst causing the disproportionation, that is, palladium compound or complex and tertiary phosphine, rapidly loses its activity when the reaction mixture is exposed to atmospheric oxygen. It is therefore advantageous to operate with exclusion of oxygen, for example in a colored system or under protective gas, such as nitrogen or argon.

The following examples illustrate the invention, in which examples, by selectivity there is to be understood the molar yield of reaction product in percent, relative to the reacted substituted or unsubstituted allylamine. Because of the principle of the disproportionation, one mole of diamine may yield one mole each of monoanime and triamine, that is, the selectivity is to be 100 percent per mono- and triamine.

EXAMPLE 1

1 mole (97 g) of diallylamine is heated together with 1 g of palladium acetate and 5.0 g of triphenylphosphine in a flask connected to a column until reflux of the diallylamine. The apparatus is flushed with nitrogen as protective gas.

The allylamine formed by disproportionation is taken off at the top of the column. During the reaction time of about 4 hours, the sump temperature rises from about 110°C to about 150°C. After this period, the sump product containing substantially triallylamine is distilled off the catalyst. At a conversion rate of 86.9 mole percent of diallylamine, mono- and triallylamine having a selectivity of 92.4 mole percent and 96.0 mole percent, respectively, are formed. As by-product, some $NH_3$ is obtained.

EXAMPLE 2

(Comparative Example)

When, as in Example 1, diallylamine is heated together with the palladium acetate and triphenylphosphine catalyst until reflux of the diallylamine, while the apparatus is flushed with air, practically no disproportionation occurs.

EXAMPLE 3

1 mol of di-(2-methylallyl)-amine is refluxed together with 1.2 g of benzonitrile-palladium chloride and 3.0 g of triphenylphosphine in a reaction vessel under a nitrogen atmosphere. The 2-methylallylamine formed is separated from the reaction mixture by slow distillation via a column. After 4 hours, the distillate and the sump product are analyzed. At a conversion rate of 90.3 mole percent of di-(2-methylallyl)-amine, mono- and tri-(2-methylallyl)-amine having a selectivity of 76.6 and 99.6 mole percent, respectively, are obtained.

EXAMPLE 4

1 mole of dicrotylamine (di-(3-methylallyl)-amine) is mixed with 100 ml of p-xylene, reacted with 1.5 g of bis (triphenylphosphine)-palladium chloride and 2.5 g of triphenylphosphine as described in Example 2, and separated by distillation from the crotylamine formed. At a 84.7 percent conversion rate of dicrotylamine, mono- and tricrotylamine having a selectivity of 51.4 and about 100 mole percent, respectively, are obtained.

EXAMPLE 5

The amine mixture obtained in the reaction of 2-ethyl-3-propylallyl chloride with 28 % aqueous $NH_3$ solution at 90° to 100°C in an autoclave, on account of gas chromatography analysis contains 25 millimoles of mono-(2-ethyl-3-propylallyl)-amine, 55 millimoles of di-(2-ethyl-3-propylallyl)-amine and 21.5 millimoles of tri-(2-ethyl-3-propylallyl)-amine. After addition of 0.50 g of triphenylphosphine and 0.05 g of palladium acetate, the mixture is heated for 4 hours from 75°C to 140°C at 10 to 15 mm Hg and with $N_2$ flushing, and the product passing over is collected. The residue and the distillate are analyzed by gas chromatography. At a decrease of 12.9 millimoles of di-(2ethyl-3-propylallyl)-amine, that is, a conversion rate of 23.4 percent, 10 millimoles of mono- and 11.7 millimoles of tri-(2-ethyl-3-propylallyl)-amine, corresponding to a selectivity of 77.5 and 90.7 mole percent, respectively, are obtained in addition to the corresponding substances already present in the starting mixture.

EXAMPLE 6

The amine mixture obtained in the reaction of 2-methylallyl chloride with 28 percent aqueous $NH_3$ solution at 90°C in an autoclave and after work-up is composed of primary, secondary and tertiary amine in a molar ratio of mono- to di- to tri-(2-methylallyl)-amine corresponding to 55.2:27.5:9.1.

After addition of 0.5 g of palladium acetate, 30 g of triphenylphosphine and 3.0 g of sodium phenolate to 100 g of this mixture, and distilling off the 2-methylallylamine under $N_2$, a new molar ratio of mono- to di- to tri-(2-methylallyl)-amine corresponding to 64.7:3.5:21.0 has adjusted in the total distillate and residue.

EXAMPLE 7

0.1 mole of di-(2,7-octadienyl)-amine is dissolved in 20 ml of p-xylene, 0.3 g of palladium acetate and 0.5 g of triphenylphosphine are added, and the whole is refluxed under $N_2$. After 30 minutes of reaction time, mono- and tri-(2,7-octadienyl)-amine can be detected by gas chromatography as newly formed products.

What is claimed is:

1. A process for the disproportion of the diallylamines of the formula I $$(R^1HC=CR^2-CH_2)_2NH \quad (I)$$

where $R^1$ and $R_2$ each are hydrogen, lower alkyl or alkenyl having up to 5 carbon atoms to the corresponding mono- and triallylamines of the formulae II and III $$R^1HC=CR^2-CH_2NH_2 \quad (II)$$

$$(R^1HC=CR^2-CH_2)_3N \quad (III)$$

where $R^1$ and $R^2$ are as defined above, which comprises reacting the diallylamines in the presence of from 0.1 to 5 mole percent of said diallylamines of a catalyst system containing (1) a compound or a complex of palladium and (2) triphenyl phosphine or tributyl phosphine, the molar ratio of phosphorus to palladium in said catalyst system being from 2:1 to 1000:1.

2. A process as claimed in claim 1, which comprises using a salt or a complex or bivalent palladium as compound or complex of palladium.

3. A process as claimed in claim 1, which comprises using triphenylphosphine as tertiary phosphine.

4. A process as claimed in claim 1, which comprises carrying out the reaction with exclusion of oxygen.

* * * * *